June 8, 1926.
J. P. SEAHOLM ET AL
1,587,606
RELEASEABLE HITCH
Filed Sept. 16, 1922.   3 Sheets-Sheet 1
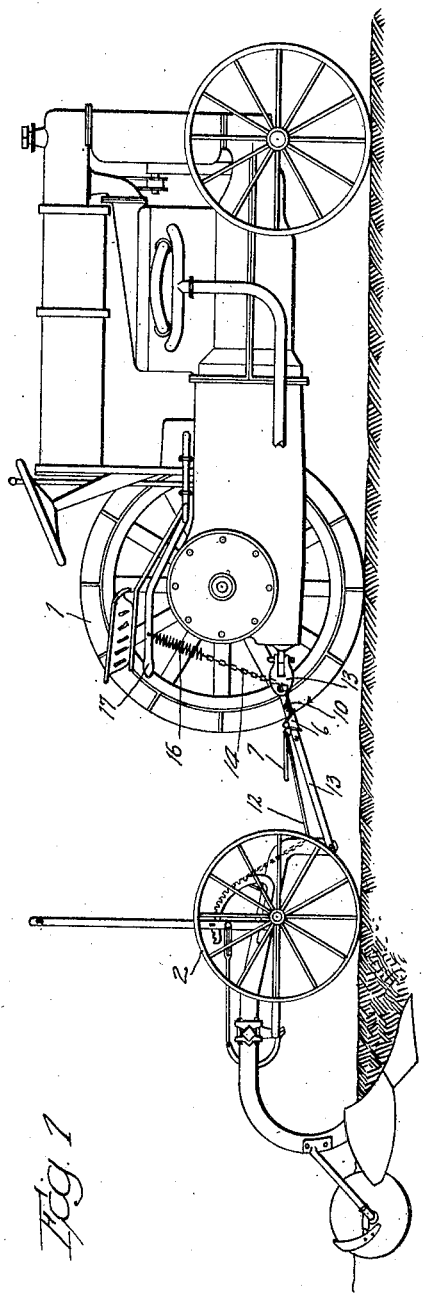
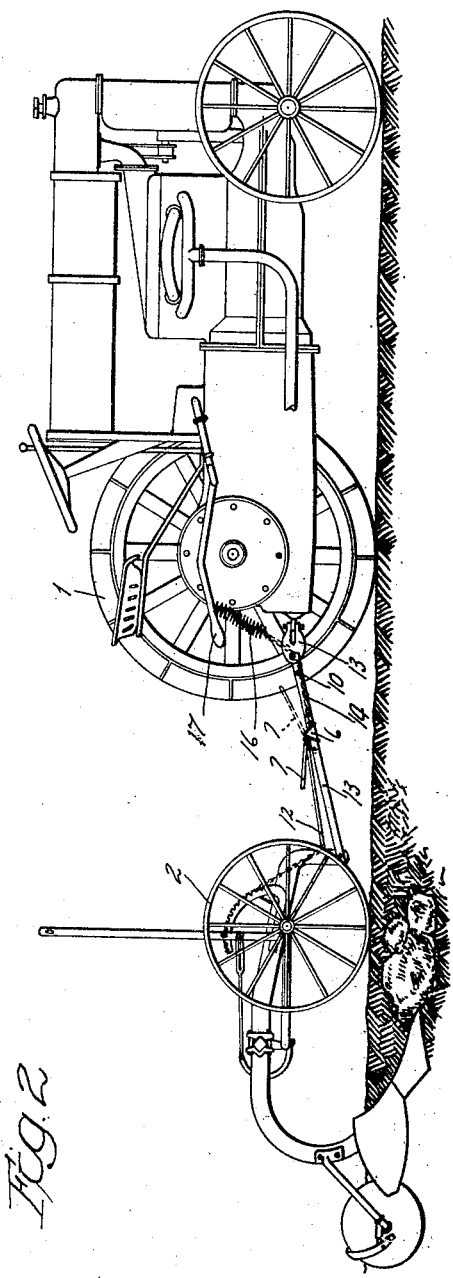
INVENTORS
John P. Seaholm
Henry P. Corbin
BY L.C. Shonts
ATTORNEY

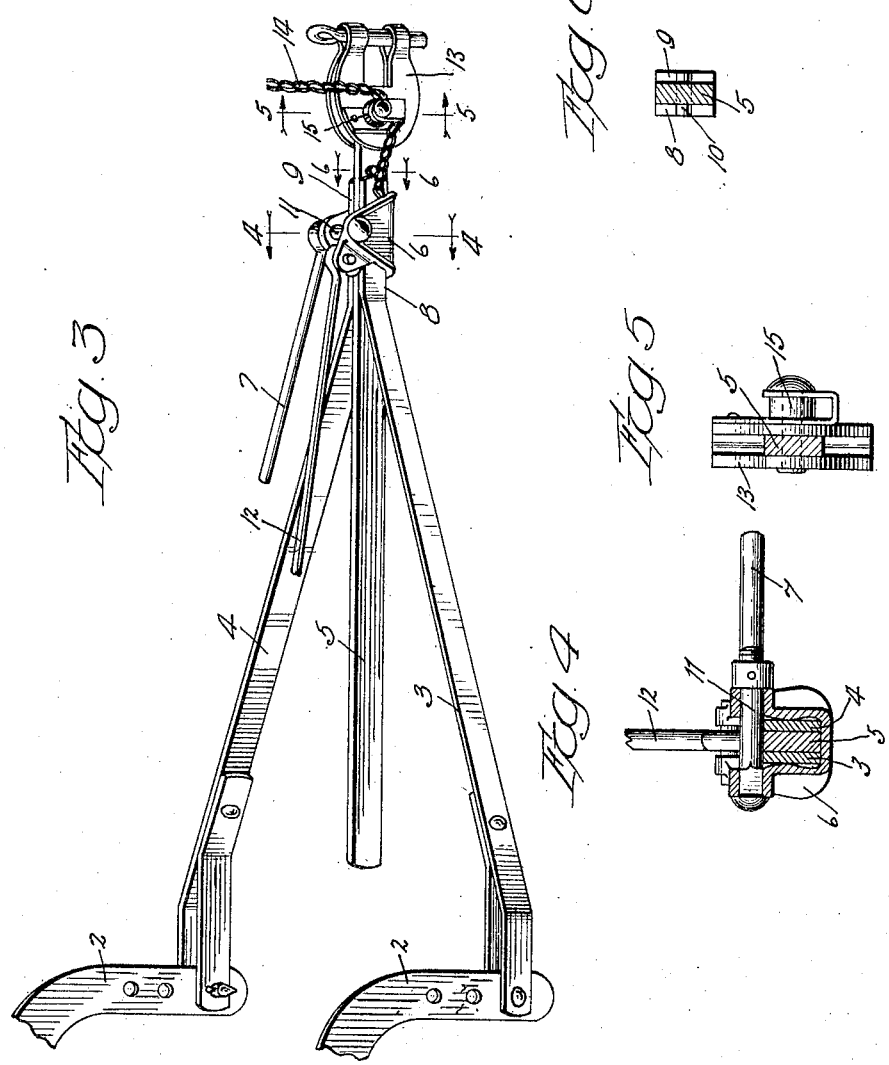

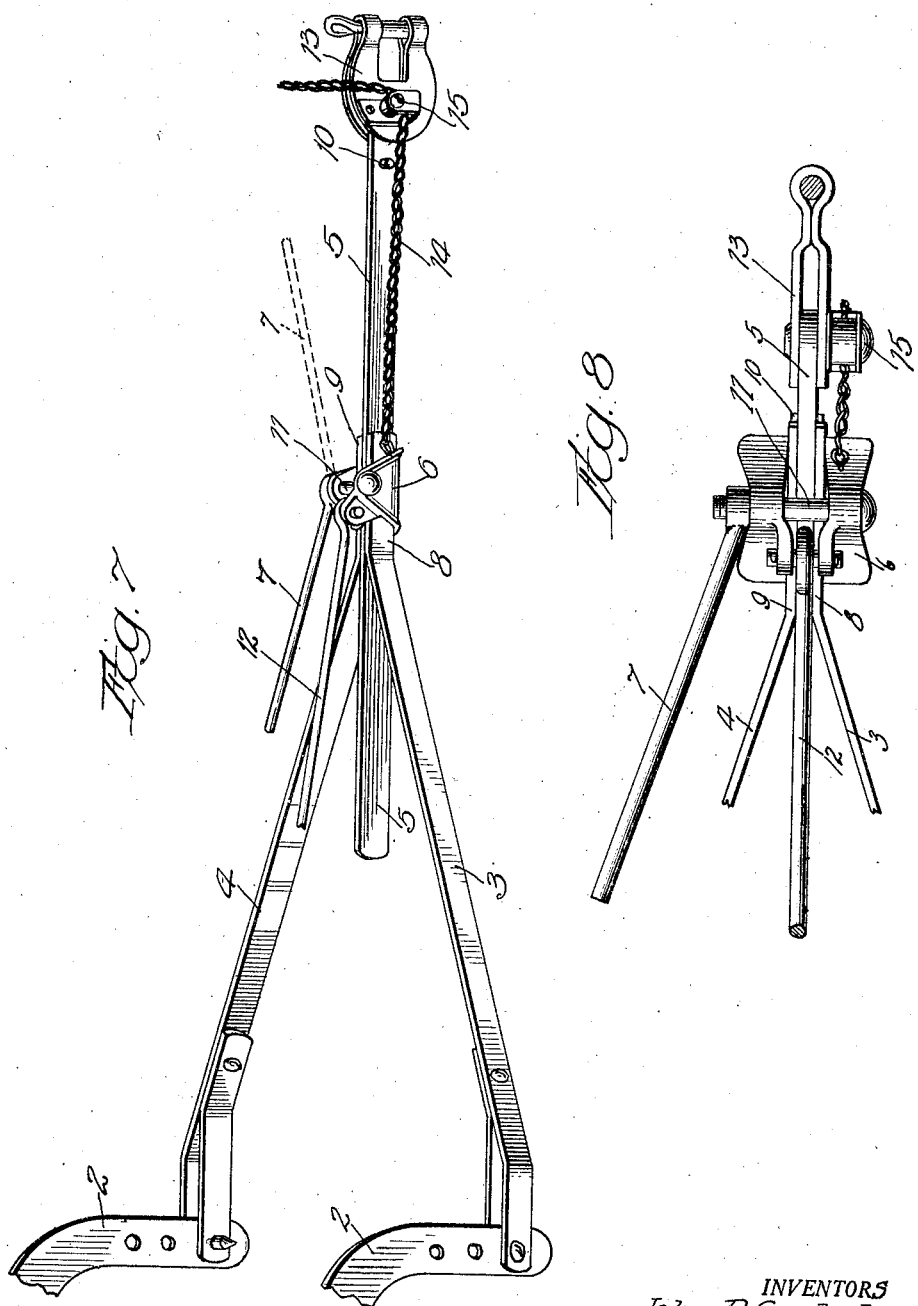

Patented June 8, 1926.

1,587,606

UNITED STATES PATENT OFFICE.

JOHN P. SEAHOLM AND HENRY P. CORBIN, OF MOLINE, ILLINOIS, ASSIGNORS, BY MESNE ASSIGNMENTS, TO MOLINE IMPLEMENT COMPANY, A CORPORATION OF ILLINOIS.

RELEASABLE HITCH.

Application filed September 16, 1922. Serial No. 588,686.

The invention relates to a releasable hitch.

It relates particularly to hitches used for connecting farm implements to tractors, so that when the draft on the implement exceeds a predetermined amount, the hitch will release the tractor before the implement is damaged.

Hitches of this general type have been heretofore made but several difficulties have been encountered in using them one of which is that it is difficult for one man operating a tractor to reconnect the hitch after it is separated. He cannot operate the tractor controls and at the same time guide the hitch parts to position. The present invention is directed toward providing a hitch in which this difficulty is overcome.

The general object of the invention is to provide an improved releasable hitch.

A more specific object is to provide a releasable hitch which may be easily reconnected after it has been released.

A further object is to provide a releasable hitch that will automatically stop the tractor when it releases.

Other objects and advantages of the invention will appear from the specification and drawings.

An embodiment of the invention is shown in the drawings in which,

Figure 1 is a side elevation of the hitch connecting a tractor with a plow.

Figure 2 is a side elevation similar to Figure 1, except that the hitch is shown in released position.

Figure 3 is a perspective of the hitch in its connected position.

Figure 4 is a section on the line 4—4 of Figure 3.

Figure 5 is a section on the line 5—5 of Figure 3.

Figure 6 is a section on the line 6—6 of Figure 3.

Figure 7 is a perspective of the hitch in its released position.

Figure 8 is a plan view of the hitch in connected position.

The hitch, as illustrated in Figures 1 and 2, connects a tractor 1 of conventional type with a tractor plow 2. While the hitch is particularly useful for connecting farm implements to tractors, it is to be understood that it is not limited to connecting any certain type of implement with any particular type of tractor, but it is capable of general use as a releasable draft connection.

The hitch comprises, in general, a pair of hitch bars 3 and 4 illustrated in Figure 7, a draw bar 5, a clamp 6, and a lever 7 for operating the clamp.

The hitch bars 3 and 4 may be of any suitable shape, length and construction, depending upon the type of implement to which it is desired to connect the hitch device. As illustrated, the bars are separated at one end for connection to the implement 2 and they converge toward their forward ends forming two parallel portions 8 and 9 between which is received the draw bar 5.

The draw bar 5 is preferably a plain metal bar of size and width to fit between the parallel ends 8 and 9 of the bars 3 and 4. It is preferably of considerable length, so that when the hitch is connected, it extends rearwardly some distance between the bars as shown in Figure 3. It is provided with a stop 10 limiting its rearward movement, such stop contacting against the ends of the parallel portions 8 and 9 of bars 3 and 4.

The clamp 6 surrounds the two ends 8 and 9 of the bars 3 and 4 and grips them and the draw bar 5 together. The clamp is preferably a U-shaped member with the bottom of the U under the bar. The two arms of the U extend above the bars 5, 8 and 9 and a bolt 11 is passed through openings in the arms, one end of the bolt being fixed in one of the arms and the other one on the other end extending through and being threaded for the reception of the clamping lever 7. The inner faces of these clamp arms are slightly concave, as illustrated in Figure 8, so that when pressure is exerted upon them by means of the clamping lever 7, a better gripping action will be secured.

Pivoted to the clamp is a link 12 which extends rearwardly and is connected to the implement by a flexible chain illustrated in Figures 1 and 2. The draw bar 5 is connected to a tractor through a clevis 13 of any suitable type.

The operation and advantages of this hitch are as follows:

When the hitch is connected, it is in the position illustrated in Figure 3. The draw bar 5 extends rearwardly between the draft bars 3 and 4 and the clamp 6 holds the parts firmly together, the clamping lever 7 having been turned to the proper position for accomplishing this result. Under normal operating conditions, the hitch remains in this position. When the implement strikes obstructions or is otherwise retarded, so that the draft increases, the parts will continue to remain in the same position until the draft is sufficiently great to slide the draw bar 5 between the parallel ends 8 and 9 of the draft bars 3 and 4. This sliding of the parts or releasing of the hitch takes place before the draft has become so great as to damage the implement, the exact point at which the hitch releases being adjusted by varying the tightness with which the lever 7 is tightened in tightening the clamp 6.

As previously stated, when the hitch releases, the draw bar 5 slides between the bars 8 and 9, but on account of the length of the draw bar 5, it will not slide out from between the bars until the tractor has moved a considerable distance forward. If it has not moved from between the bars, it is a simple matter to reset the hitch by simply swinging the clamping lever 7 forward to the dotted line position shown in Figures 2 and 7, thereby loosening the clamp 6, after which the tractor may be backed up to position, the draw bar 5 moving back to the position shown in Figure 3, whereupon the clamping lever 7 may be moved back to its original position, or if it is desired, it may be pushed still farther, thereby clamping the hitch together more tightly than before. If the tractor has moved sufficiently forward to disengage the bar 5 entirely, the hitch may, nevertheless, be reset very easily, because the bar 5 is so long that it is not necessary to back the tractor to an exact position before being able to reconnect the hitch. If the tractor is backed approximately to the right position, it is possible to insert the bar 5 between the bars 8 and 9, whereupon the tractor can be backed still farther to push the bar to the position shown in Figure 3.

In order to insure that the bar 5 is not completely disengaged from the hitch, means has been provided for automatically stopping the tractor when the hitch releases. A flexible chain 14 is connected to the clamp 6, passes under a pulley 15 on the clevis 13, and extends upwardly to where it is connected by means of a spring 16 to the clutch lever 17 of the tractor. When the hitch releases, that is, when the parts move from the position shown in Figure 3 toward the position shown in Figure 7, a pull is exerted on the chain 14, and transmitted through the spring to the clutch lever 17, and as soon as the tractor has moved forward slightly, the clutch is disengaged, whereupon the tractor stops. This automatic feature is extremely convenient, because it, not only insures that the draw bar will not be disconnected from the hitch, but it also prevents the tripping rope of the implement from being torn off of the tractor to which it is usually tied for the convenience of the operator. It also stops the tractor in a position to permit it to be easily backed up and the hitch to be reset.

The spring 16 provides a yieldable connection between the hitch and the clutch operating lever that permits the operator to reconnect the clutch after it has been tripped out by the releasing of the hitch. If the connection between the parts were rigid the clutch could not be reconnected to back the tractor. The spring is a simple, inexpensive, and efficient device for overcoming this difficulty, its action being such that the clutch is tripped out but the operator may nevertheless reconnect it manually at will.

It will be observed that a hitch has been provided that not only automatically releases so as to prevent breaking of the implement, but it also permits of easy resetting, so that one man operating the tractor can easily back the tractor and rest the hitch. It, furthermore, provides a hitch having releasing points which may be adjusted very easily and quickly to suit the requirements. These advantages are very marked in practical operation, where one man usually drives the tractor when it is hooked to a plow and where, if the hitch cannot be easily reset, it is extremely difficult to reset it at all, because one man cannot operate the tractor and at the same time hold the parts of the hitch in position, so that they will coincide for reconnection.

It is to be understood that construction shown is for purposes of illustration and that variations may be made in it without departing from the spirit and scope of the invention as defined by the appended claims.

We claim:

1. A releasable hitch for tractors having a member for attachment to a tractor, a member for attachment to a device to be drawn, said members being positioned adjacent one another in frictional engagement with each other, clamping means for clamping the members together in frictional engagement, said means having a single operating lever for quickly varying the pressure of the clamping means on the members to vary the degree of frictional engagement to vary the force required to cause said members to move relative to one another.

2. A releasable draft device for tractors having a member for attachment to a tractor, a member for attachment to a device to be drawn, said members being positioned adjacent one another in frictional engagement so that one may move relative to the other a substantial extent without being separated from it but will separate if moved sufficiently, clamping means for clamping the members together in frictional engagement to normally prevent relative movement of the members, and a single lever operable from a position on the seat of a tractor to which the device may be connected for loosening and tightening the clamping means by a forward or backward movement of the lever to thereby vary the clamping pressure on the members to vary their frictional contact.

3. A releasable draft device for tractors having a member for attachment to a tractor, a member for attachment to a device to be drawn, said members being positioned adjacent one another and in frictional engagement so that one may move relative to the other a substantial extent without being separated from it, clamping means for clamping the members together in frictional engagement to normally prevent relative movement of the members, and an operating lever for quickly loosening and tightening the clamping means so that, if the members are moved relatively to each other under an excessive draft, the clamping means may be quickly loosened by a throw of the lever to relieve the frictional engagement of the members to permit them to be brought to their original position by a reverse movement as by backing a tractor and again clamped together to a desired degree of tightness by a reverse movement of the lever.

4. A releasable draft device for tractors having a member provided with spaced parallel portions, a second member positioned between the parallel portions of sufficient length to slide between them for a substantial distance without being disconnected from them, clamping means for clamping said members together in frictional contact to normally prevent relative movement of the members, and an operating device for quickly adjusting the clamping means to vary the force required to move said members relative to one another, said device also serving as a means for quickly lowering the clamping means to relieve the frictional engagement of the members after the members have moved relative to one another to thereby permit them to be reset by a severe movement and again quickly clamped together.

5. A releasable draft device for tractors having a member provided with parallel portions, a second member positioned between said portions and in frictional engagement with them, said second member being of sufficient length to slide between said portions for a substantial distance without being disconnected from them, clamping means for releasably clamping said members together to normally prevent their relative movement and an adjusting means operated by a single lever for quickly loosening and tightening the clamping means to vary the frictional contact of the members.

6. A releasable draft device for tractors comprising draft bars for attachment to a device to be drawn, said bars being spaced apart at their rear ends and converging forwardly with the forward ends having parallel portions, a hitch bar for attachment to a tractor, said bar being located between the parallel portions of the draft bars and extending to the rear between the converging portions of said bar so that the hitch bar may move forward relative to the draft bars without being separated from them, and clamping means surrounding the parallel portions of the draft bars for gripping them and firmly but releasably clamping them to the hitch bar, said clamping means including a device for quickly and easily adjusting the tightness with which said bars are clamped together to thereby vary the point at which the hitch bar will begin to move relative to the draft bar, said device also serving as a means for quickly loosening the clamping means after the hitch bar has moved forward relative to the draft bars to thereby permit the device to be reset by a reverse movement, as by backing a tractor, after which the parts can be again quickly clamped together with varying degrees of tightness.

7. A releasable draft device for tractors comprising draft bars for attachment to a device to be drawn, said bars converging forwardly and having parallel portions, a second draft bar for attachment to a tractor extending between the parallel portions of the first draft bars and to the rear of them, clamping means surrounding the parallel portions for gripping them and clamping the bars together, and means controlled by a single lever for adjusting the clamping means.

8. A releasable draft device for tractors having draft bars adapted to be connected to a drawn device and provided with parallel portions, a hitch bar located between the parallel portions and extending rearwardly a distance such that the hitch bar may move forward relative to the draft bars for a substantial distance without being separated from them, a U-shaped clamping member surrounding the draft bars with the arms of the U extending above the bars, and means connecting the arms together above said bars including a lever for quickly adjusting said means to vary its tightness to thereby vary the point at which the hitch bar will begin to move relative to the draft bars.

9. A releasable hitch for tractors, having two draft bars spaced at their rear ends and converging forwardly with the forward ends arranged parallel to one another, a hitch bar located between the parallel portions and extending rearwardly a distance such that the hitch bars may move forward a substantial distance without being separated from the draft bars, a U-shaped clamping device surrounding the parallel portions of the draft bars for clamping them to the hitch bar, means for quickly and easily adjusting the clamping means to vary the tightness with which said draft bars are clamped to the hitch bar, and a link connected to the clamping means and extending rearwardly for connection to a device to be drawn.

10. A releasable draft device for tractors comprising draft bars having parallel portions, a hitch bar located between the parallel portions of the draft bars and extending rearwardly a distance such that the hitch bar may move forward relative to the draft bars a substantial distance without being separated from them, a U-shaped clamping member surrounding the draft bars and including means for adjusting the degree of tightness with which the bars are clamped together to vary the point at which the hitch bar will be moved relative to the draft bars, a clevis connected to the hitch bar, a guide carried by the clevis, and a cable for connection to a device for stopping the tractor, said cable being connected to the clamping means and passing through the guide on the clevis.

11. The combination with a tractor of a releasable draft device having a member attached to the tractor, a member for attachment to a device to be drawn, said members being positioned adjacent one another and in frictional engagement so that they may move relative to one another a substantial distance without being separated but will separate if moved sufficiently, means for releasably clamping said members together in frictional engagement to normally prevent movement of the members relative to one another, said clamping means including a lever operable by an operator from a position on the seat of the tractor for quickly and easily adjusting the degree of tightness of said clamping means, and mechanism connected to one of said members and operated by relative movement of them for stopping the tractor when the members move relative to one another and before they separate so that the draft device may be reset by the operator by loosening the clamping means by means of the lever, backing the tractor, and resetting the clamping means with the lever.

12. The combination with a tractor, of a releasable hitch, having a member for attachment to the tractor, a member for attachment to a device to be drawn, means for releasably clamping said members together so that they will not normally move relative to one another but will so move when the draft on them exceeds a predetermined value, movable means on the tractor for stopping it and connections between said movable means and one of said members to move said means to stop the tractor when the members move relative to one another, said connections including a yieldable portion against which the movable means may be manually moved to start the tractor after the hitch has been moved to a position for stopping the tractor.

13. The combination with a tractor having a clutch of a releasable hitch having a member for attachment to the tractor, a member for attachment to a device to be drawn, means for releasably clamping the members together so that they will not normally move relative to one another but will so move when the draft exceeds a predetermined value, and connections between one of said members and the tractor clutch to disengage the clutch when the members are moved relative to one another, said connections including a yieldable portion which permits the clutch to be engaged to start the tractor after the parts have been moved to disengage the clutch.

In testimony whereof, we affix our signatures.

JOHN P. SEAHOLM.
HENRY P. CORBIN.